US008917833B1

(12) United States Patent
Henderson

(10) Patent No.: US 8,917,833 B1
(45) Date of Patent: Dec. 23, 2014

(54) SYSTEM AND METHOD FOR NON-PRIVACY INVASIVE CONVERSATION INFORMATION RECORDING IMPLEMENTED IN A MOBILE PHONE DEVICE

(75) Inventor: Donnie Henderson, Manalapan, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1925 days.

(21) Appl. No.: 11/085,729

(22) Filed: Mar. 21, 2005

(51) Int. Cl.
*H04M 1/64* (2006.01)

(52) U.S. Cl.
USPC .......................................... 379/88.22; 379/68

(58) Field of Classification Search
USPC ............................................. 379/67.1, 88.22
See application file for complete search history.

(56) References Cited

U.S. PATENT DOCUMENTS

| 5,361,295 A | 11/1994 | Solomon et al. |
| 5,596,627 A | 1/1997 | Solomon et al. |
| 5,604,792 A | 2/1997 | Solomon et al. |
| 5,623,536 A | 4/1997 | Solomon et al. |
| 5,768,348 A | 6/1998 | Solomon et al. |
| 5,809,114 A | 9/1998 | Solomon et al. |
| 5,933,488 A | 8/1999 | Marcus et al. |
| 5,995,824 A * | 11/1999 | Whitfield .................... 455/412.1 |
| 6,134,521 A * | 10/2000 | Kotzin .......................... 704/226 |
| 6,222,909 B1 * | 4/2001 | Qua et al. .................... 379/88.22 |
| 6,366,651 B1 * | 4/2002 | Griffith et al. ............. 379/88.14 |
| 6,671,353 B1 * | 12/2003 | Goh ............................. 379/67.1 |
| 6,785,368 B1 * | 8/2004 | Eason et al. ................ 379/88.19 |
| 6,987,841 B1 * | 1/2006 | Byers et al. ................. 379/88.17 |
| 7,035,666 B2 * | 4/2006 | Silberfenig et al. ........ 455/556.1 |
| 7,155,208 B2 * | 12/2006 | Chitrapu .................... 455/412.1 |
| 8,254,533 B2 * | 8/2012 | Johnston et al. ........... 379/88.14 |
| 2004/0252679 A1 * | 12/2004 | Williams et al. .............. 370/356 |
| 2005/0107071 A1 * | 5/2005 | Benco et al. .................. 455/413 |

* cited by examiner

*Primary Examiner* — Joseph T Phan

(57) ABSTRACT

A method of recording audio/video or a combination of audio/video information on a local, possibly mobile, device while in a live communication with one or more parties. The method comprises signaling the compute device to perform a routing of input directly to its internal recording subsystem, not transmitting the input over the communication, signaling the compute device to resume normal routing of its input for transmission, indexing and storing (recording) the input in a local data store and retrieving the locally stored information for later playback. A system and computer-readable medium are also disclosed.

14 Claims, 3 Drawing Sheets

US 8,917,833 B1

SYSTEM AND METHOD FOR NON-PRIVACY INVASIVE CONVERSATION INFORMATION RECORDING IMPLEMENTED IN A MOBILE PHONE DEVICE

BACKGROUND OF THE INVENTION

1. Field of the Invention

The present invention relates to a system and method of providing a non-privacy invasive recording capability on a computing device such as a hand-held computing device with a phone capability.

2. Introduction

Telephone service and equipment providers are constantly seeking to provide new features that are useful but also retain the privacy of those involved in a telephone call. Various ways of recording audio is one area in which some innovation has occurred. There is a challenge with a telephone having a recording capability, however. Where two or more people are involved in a telephone call, privacy issues arise that can easily be abused.

Telephone manufacturers and service providers are reluctant to include a recording capability where two parties to a conversation are recorded. In that scenario, only one party will likely be aware of the recording and a variety of legal and ethical problems can arise by recording the voice and speech of the party or parties to the call that are unaware of the recording.

However, there are many advantages to being able to record a voice on a telephone-enabled computing device and especially during a telephone call. What is needed in the art is a system and method of providing a recording capability that preserves the privacy rights of one or more people to a telephone call.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

The present invention addresses the problem set forth above by providing a system and method of recording sound on a computing device that does not invade the privacy of an unsuspecting person to a telephone call. The invention enables a person engaged in a telephone call to record conversation information or conversation "notes" into their computing device in such a way as to not record the voice or sounds from the other party to the call. Thus, the privacy of that individual is not compromised.

The invention comprises a system, method and computer-readable media and other embodiments for recording portions of a telephone conversation from one person while not recording one or more other parties to the call.

The method comprises signaling the compute device to perform a routing of input directly to its internal recording subsystem, not transmitting the input over the communication, signaling the compute device to resume normal routing of its input for transmission, indexing and storing (recording) the input in a local data store and retrieving the locally stored information for later playback. The input is primarily audio, but may also be video, multi-media or any other input.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
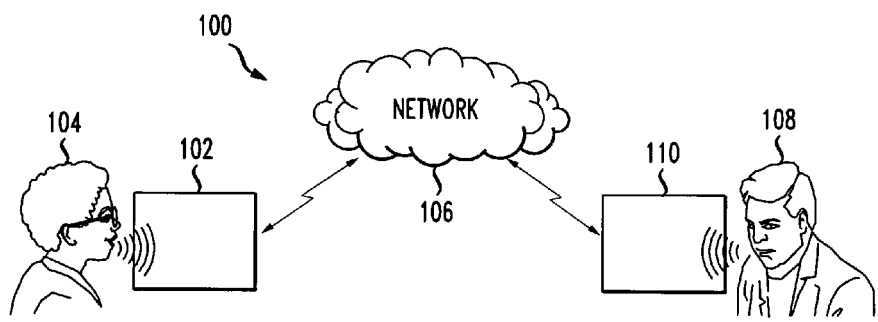
FIG. 1 illustrates the basic framework of the present invention.

FIG. 1 illustrates the basic architecture 100 and context of the present invention. The present invention is applicable to any device where a person carries on a conversation with another person. Non-limiting examples include a phone, a walkie-talkie, a two-way radio device, and so forth. Any application where a listening party on a device needs to capture information from incoming audio. The person who will practice the invention can transcribe and/or restate the received audio information (in contrast to recording the incoming audio) and thus eliminate privacy problems. The incoming audio may also come from a spoken dialog system and therefore only one human may be involved in the conversation. A first computing device 102 is used by a first user 104 and through a communications network 106 at least one person, the second user 108 uses a second computing device 110 to engage in a conversation with the first user 104. There is no limitation or restriction on the type of computing device at either end of the conversation or the type of communications network through which they communicate. The computing devices 102, 110 may be, for example, telephones, mobile computing devices enabling the user to talk and have a "telephone call" with another user, computers through which a VoIP conversation can occur through a packet network, wireless computing devices and so forth. There may be any combination of these various possibilities. There is no need for the computing devices to be the same. It is preferred that the devices and the network enable an audible conversation between the users. The invention may work in other contexts as well where a user may be engaged in a video conference or an instant messaging text session and so forth.

Figure 2:
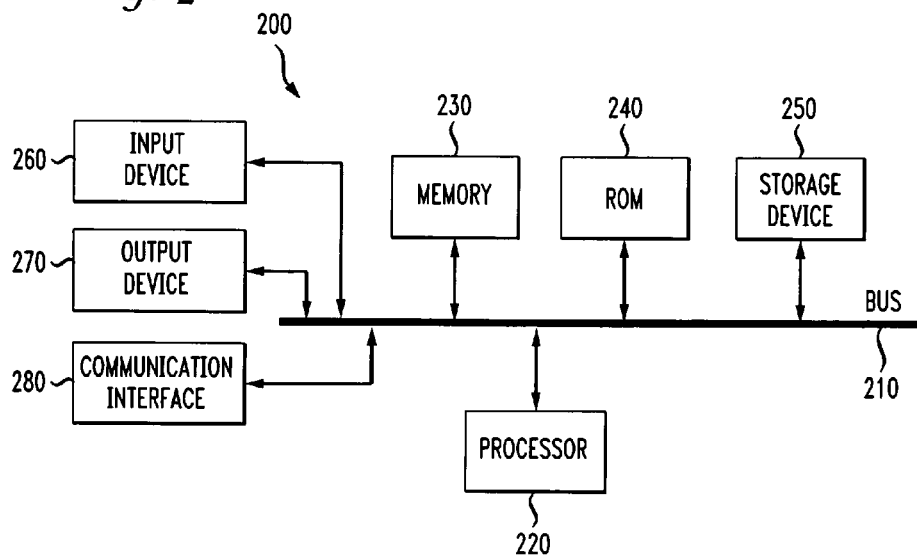
FIG. 2 illustrates an example hardware components of a system aspect of the invention.

With reference to FIG. 2, an exemplary system for implementing the invention includes a general purpose computing device 200, including a processing unit (CPU) 220, a system memory 230, and a system bus 210 that couples various system components including the system memory 230 to the processing unit 220. The system bus 210 may be any of several types of bus structures including a memory bus or memory controller, a peripheral bus, and a local bus using any of a variety of bus architectures. The system may also include other memory such as read only memory (ROM) 240 and random access memory (RAM) 250. A basic input/output (BIOS), containing the basic routine that helps to transfer information between elements within the computing device 200, such as during start-up, is typically stored in ROM 240. The computing device 200 further includes storage means such as a hard disk drive 260, a magnetic disk drive, an optical disk drive, tape drive or the like. The storage device 260 is connected to the system bus 210 by a drive interface. The drives and the associated computer-readable media provide nonvolatile storage of computer readable instructions, data structures, program modules and other data for the computing device 200. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that is accessible by a computer, such as magnetic cassettes, CDs, DVD, flash memory cards, digital video disks, data cartridges, random access memories (RAMs) read only memory (ROM), and the like, may also be used in the exemplary operating environment.

Telephony service/equipment providers want to provide recording related features that are useful but that do not invade the privacy of participants on a call. Further, the additional features that are "cool" will encourage new users to purchase equipment and buy services from phone providers. Recording audio is just such as feature but has been slowly gaining acceptance because of the privacy challenges. The present invention provides a new approach using recording on such devices.

The context of the present invention is that it is beneficial during a communication session between a first user and a second user. Preferably, the session is a telephone call but it may also refer to a video conference, an instant messaging session, or a telephone call where one user is talking and the other is viewing text or writing as occurs where calls are made to a deaf person. Therefore, the principles of the invention may be applicable to other contexts beyond just a voice recording during a voice conversation.

The invention allows a person to record "notes", spoken words, other audio, other artificially generated sounds, writing in text or gestures, video or any other information that can be recorded, preferably locally on the computing device, during a communication session. With this method, one can effectively "self record" or verbally transcribe desired portions of a conversation without fear of invading the privacy of the other party or parties. While the recorded information performed during a communication between two people may be of any type, the preferred embodiment of the invention is to record audio from the user of the computing device.

Figure 3:
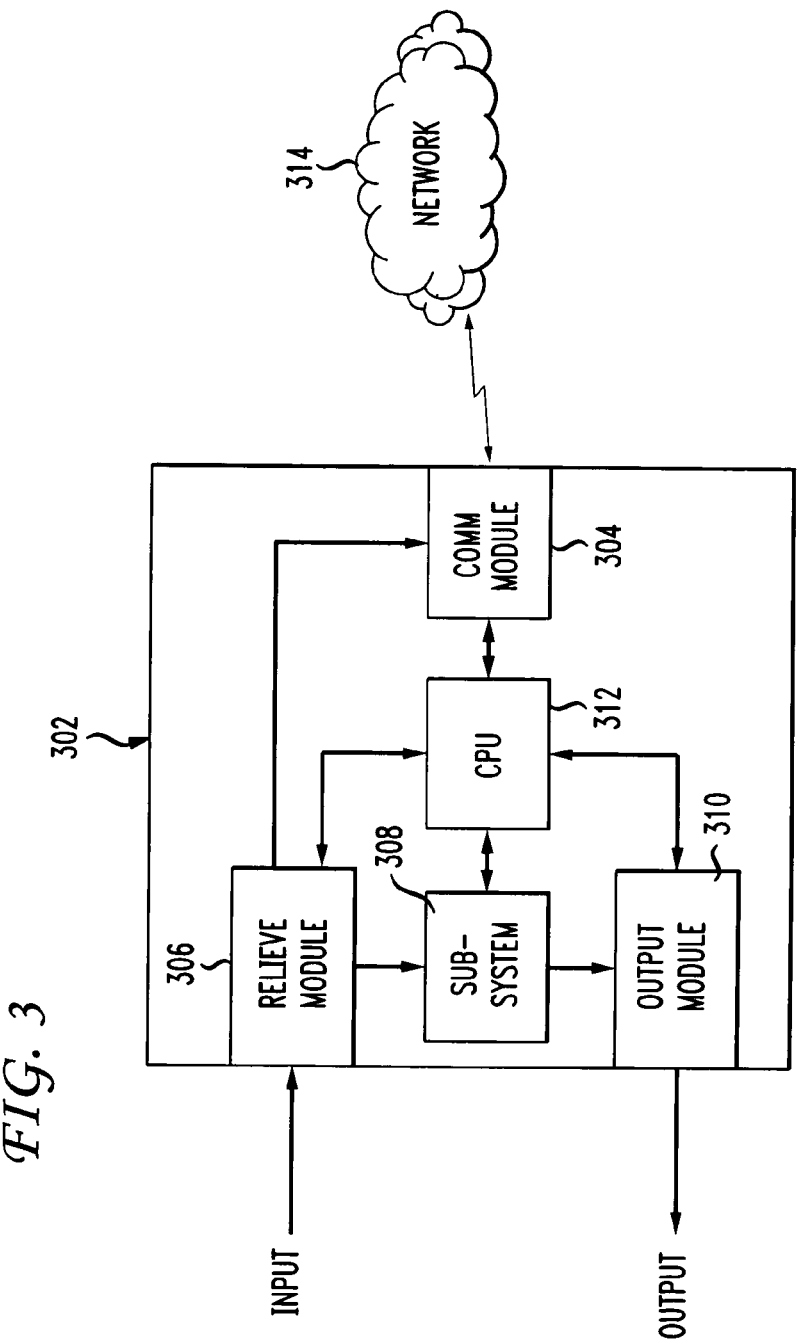
FIG. 3 illustrates an example computing device for use in the present invention.
Figure 4:
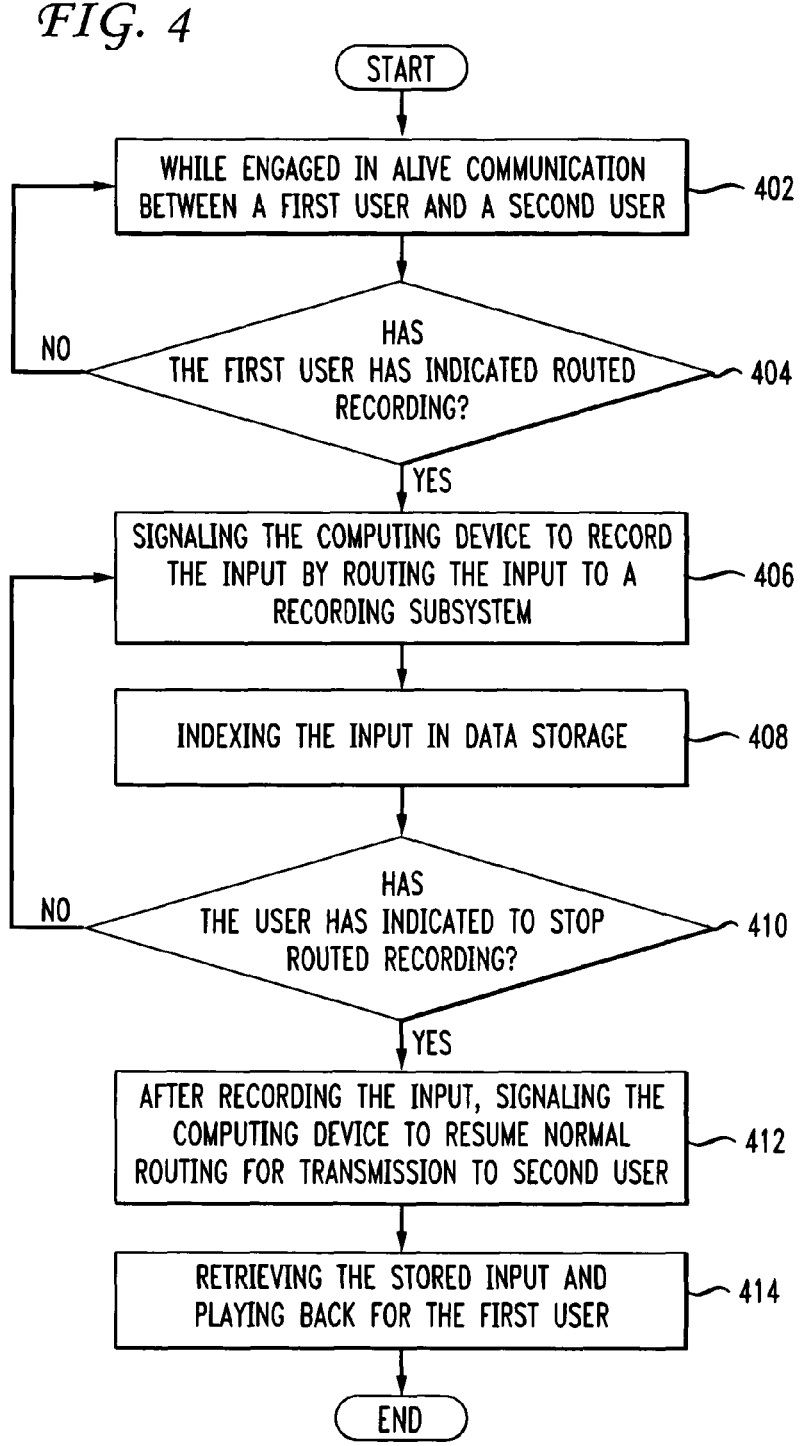
FIG. 4 illustrates a method aspect of the invention.

While many typical phone devices have the ability to make voice recordings, the recording feature can only be used when phone device is not being used for a call. The present invention improves upon the state of the art by providing the ability to record during a call or other communication by routed user input to an internal recording subsystem. An exemplary device is shown in FIG. 3 and the method embodiment of the invention is shown in FIG. 4. These two figures are referenced in the following discussion.

FIG. 3 illustrates an example computing device 302 according to the present invention. This may be mobile phone, a mobile computing device with any other capabilities that also preferably includes a phone capability. If the communication between the first party and the second party is not an audio communication, then the computing device only need have the ability to receive non-audio user input and communicate that input to a second user. User input is received by module 306. This represents any type of user input and is preferably a microphone but may also encompass gesture input through a touch-sensitive screen, multi-media input through a camera or video camera and so forth. A central processing unit controls the input module 312. A communication module 304 receives communication from at least the input module 306 and transmits it to a network 314 where one or more users are also in live communication. The network 314 may be a telephone network, VoIP network, wireless network, the Internet, or any other type of network used for communication. The CPU 312 is also controls the communication module 304. A recording subsystem 308 is used to record user input at least during the live communication between users. The CPU 312 also controls this subsystem 308. The subsystem may be a hard disk or any other type of recording mechanism known or developed in the future.

An output module 310 is configured to receive or retrieve information from the subsystem 308 for providing output to the user. There is no restriction on the type of output module in that this represents such output means as speakers, a display screen, any type of visual indication and so forth.

The method aspect of the invention is described next with reference to FIG. 4. The method is primarily practiced while a user of a computing device (the first user) is carrying on a live communication with a second user (402). The second user is typically using another computing device communicating with the first user's computing device via a network. The second user may also be a spoken dialog system or some other synthesized voice or sound. The first user's computing device will monitor for an indication from the first user regarding whether to initiate a routed recording (404). As mentioned above, the recording may be of any type of user input but is preferably audio input. If the user has not initiated a recording, the system continues to wait for a user indication of such routed recording. The recordation initiation input may be one of pressing a special button, pressing a special button sequence, a speech command and a gesture. Any type of user input recognized by the computing device will suffice. If yes, the user has initiated a routed recording, the method comprises signaling the computing device to record the input by routing the input to a recording subsystem (406). The routing of the input from the user changes the destination of the input from the communication means 304 of the computing device to the subsystem 308 such that the routed input is not transmitted to the second user (or users).

The system may index the first user input while or after it has been stored in the storage subsystem. The indexing is useful for later data retrieval. For example, the indexing may comprise time, input type (audio, multimedia, gesture, text, etc.), names and identification information such as e-mail, phone number, address, and so forth of those participating in the communication, location of the computing device obtained from a GPS or other location-identification system, etc.

The system also monitors to determine whether the user has indicated to stop the routed recording (410). This may be performed by the user releasing a button that has been held down to indicate routed recording, or pressing a button, or by any type of user input that the computing device can receive to indicate the end of routed recording. If no indication is received, the system continues to route the input as in step (406). Once the indication by the user is received, and preferably after the recording is complete, the system resumes normal routing of the user input such that it is transmitted through the network to the second user (412). Later, the first user can then retrieve the stored input and playback or view the stored input. The retrieval of the information is preferably simple, quick and easy. For example, the user may have a button on a touch-sensitive screen that enables playback of the recorded information. The same button or action used to record the information may be used to retrieve the information after the call. Those of skill in the art will understand these and other ways in which the information may be retrieved that are appropriate for the particular compute device.

The physical location of the storage subsystem 308 is actually immaterial to the present invention. For example, there may be a network-centric embodiment of the invention where the recording subsystem is part of a network node rather than locally storing the input. It is preferable that the subsystem be local to the computing device 302 but not necessary. The decision regarding where the storage subsystem resides may also be a combination of local storage and network-centric storage. For example, if a large-data recording of a multi-media user input is to occur, the system may determine to store the input on the network where more storage is available. However, as recording means continue to shrink in size and increase in capacity, this may or may not be an issue.

The preferred embodiment of the invention is a computing device that records audio in the manner set forth above. In this case, the input means 306 is a microphone that receives user voice or other audio input. The signaling of the computing device to record the input by routing the input to a recording subsystem in this case involves signaling the computing device to record sound input by routing the computing device microphone input to the recording subsystem. The user's voice, rather than being transmitted to the second user, is routed to the subsystem and not transmitted. The experience of the users during the routing of the input may likely be akin to the use of the mute button on many phones that mutes sound from the first use. The second user may or may not know that the first use's sound is not being transmitted to him or her.

To make the routed recording period more transparent to the second user, an aspect of the invention involves transmitting background noise consistent with the background noise of the current communication to the second user so that they are less aware of the routing of the voice or other audio of the first user to the subsystem rather than to the second user.

An example of such an "audio notepad" is described next. Assume a first user has a computing device with the features of the invention enabled by his phone service and device. While on a call, the second party to the conversation is about to provide driving directions to a restaurant. Many times the user does not have a pen or paper, or is driving, and does not have the ability to write down the address. The first user simple presses one or two buttons or provides some other type of input. This action engages the recording function in the computing device. The first user's spoken input is now routed directly to the local recording subsystem and is not transmitted as normal. Now, as the second party speaks, the first user simply listens and dictates to the computing device repeating the directions and adding other information as desired.

This useful approach is convenient because the voice transcribing process is simple and natural for people. The first user terminates the recording by another type of user input such as releasing a button or pressing a button or a DTMF sequence. There are many options and variations possible with such a phone feature.

The principles of the invention may be applied in other contexts in addition to a simple telephone call. For example, a subscriber to a conference call service, or the person who originates and arranges the call, and even a participant to the call, can have a self-record feature where they can reroute input to the call (audio, video, multi-media, etc.) as discussed above. In this aspect, the participant to the conference call could initiate via a DTMF tone or other type of signal to engage and re-route the input to a recording element either local or remote. A separate fee may be charged for this feature by the conferencing service or service provider. In a video conferencing scenario, the recording party could present a still or a synthesized or pre-recorded image such that the other party to the conference, which is likely going to be speaking for a period of time, would view the recording party as listening or participating in the communication while in fact, the recording party is verbally transcribing or recording the data that is not transmitted to the other party.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media. A tangible computer-readable storage media expressly excludes wireless interface, signals per se, or energy.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. For example, the recording capability described above can apply to any phone device, whether the device is mobile or stationary such as a home phone or a computing device with VoIP. The audio information also may be expanded to video conferencing. For example, a user in a video-conference call may route audio or both audio and video to a subsystem instead of to the other user. Accordingly, the appended claims and their legal equivalents should only define the invention, rather than any specific examples given.

I claim:

1. A method comprising:
receiving a signal indicating a first user is holding a button down;
while receiving the signal, recording a voice audio input from the first user by rerouting the voice audio input to a recording subsystem and away from a second user while continuing to route a background audio input, such that the voice audio input is not transmitted to the second user while receiving the signal and the background audio input is transmitted to the second user while receiving the signal; and
upon no longer receiving the signal, rerouting additional voice audio input to the second user with additional background audio input.

2. The method of claim 1, wherein the recording further comprises recording of a video input.

3. The method of claim 1, wherein the recording further comprises indexing the voice audio input.

4. The method of claim 3, further comprising retrieving the voice audio input recorded by the recording subsystem for later playback.

5. The method of claim 1, wherein:
rerouting of the additional voice audio input further comprises routing a microphone input to the recording subsystem; and
not transmitting the voice audio input to the second user further comprises preventing a microphone input from being transmitted to the second user.

6. The method of claim 1, wherein communications between the first user and the second user is one of a conference call, a video conference call, an instant-messaging session, and an audio communication.

7. The method of claim 6, wherein a service provider charges a fee for a participant in the communications to have a capability of rerouting input to the recording subsystem.

8. A system comprising:
a processor; and
a computer-readable storage medium having instructions stored which, when executed by the processor, cause the processor to perform operations comprising:
receiving a signal indicating a first user is holding a button down;
while receiving the signal, recording a voice audio input from the first user by rerouting the voice audio input to a recording subsystem and away from a second user while continuing to route a background audio input, such that the voice audio input is not transmitted to the second user while receiving the signal and the background audio input is transmitted to the second user while receiving the signal; and
upon no longer receiving the signal, rerouting additional voice audio input to the second user with additional background audio input.

9. The system of claim 8, wherein the recording further comprises recording of a video input.

10. The system of claim 8, wherein the recording further comprises indexing the voice audio input.

11. The system of claim 10, the computer-readable storage medium having additional instructions which result in the operations further comprising retrieving the voice audio input recorded for later playback.

12. The system of claim 8, wherein rerouting the additional voice audio input further comprises routing a microphone input to the recording subsystem, and preventing the microphone input from being transmitted to the second user.

13. A computer-readable storage device instructions stored which, when executed by a computing device, cause the computing device to perform operations comprising:
receiving a signal indicating a first user is holding a button down;
while receiving the signal, recording a voice audio input from the first user by rerouting the voice audio input to a recording subsystem and away from a second user while continuing to route a background audio input, such that the voice audio input is not transmitted to the second user while receiving the signal and the background audio input is transmitted to the second user while receiving the signal; and
upon no longer receiving the signal, rerouting additional voice audio input to the second user with additional background audio input.

14. The computer-readable storage device of claim 13, wherein the recording further comprises recording of a video input.

* * * * *